United States Patent [19]

Visser

[11] Patent Number: 4,873,502
[45] Date of Patent: Oct. 10, 1989

[54] NEGATIVE IMMITTANCE CONVERTER

[75] Inventor: Jacob S. Visser, Hilversum, Netherlands

[73] Assignee: U.S. Philips Corporation, New York, N.Y.

[21] Appl. No.: 263,654

[22] Filed: Oct. 27, 1988

[30] Foreign Application Priority Data

Oct. 29, 1987 [NL] Netherlands ............... 8702571

[51] Int. Cl.$^4$ ............................................. H03H 11/44
[52] U.S. Cl. ..................................... 333/216; 379/346
[58] Field of Search ............... 333/213, 216; 307/262; 379/340, 344, 346

[56] References Cited

U.S. PATENT DOCUMENTS 3,024,324  3/1962  Dimmer .................... 333/216 X
3,912,878  10/1975  Levi ........................... 379/346

Primary Examiner—Paul Gensler
Attorney, Agent, or Firm—David R. Treacy

[57] ABSTRACT

A negative admittance converter or a negative impedance converter can be formed from a negative immitance converter having two preferably identical transformers each having a center tapped coil and respective coil end terminals. One end of each of the coils is connected through a first amplifier element, and the other ends are connected through a second amplifier element, the amplifier elements having control inputs connected to a 180° phase shifter. The phase shifter is formed by a voltage differential amplifier having one input connected to a voltage divider connected across the first amplifier element, and the other input connected to a voltage divider connected across the other amplifier element, the amplifier differential outputs being connected to the control inputs of the first and second amplifier elements.

12 Claims, 2 Drawing Sheets

NEGATIVE IMMITTANCE CONVERTER

BACKGROUND OF THE INVENTION

The invention relates to a negative immittance converter, comprising a first transformer that includes a first coil with a center tap and a second transformer that includes a second coil with a center tap, a first terminal of the first coil being connected to a first terminal of the second coil through a first amplifier element comprising a control input, a second terminal of the first coil being connected to a second terminal of the second coil through a second amplifier element comprising a control input, the center taps of the first and the second coils each being connected to a supply point of the converter and the first and second transformers being coupled to each other by means of a 180° C. phase shifter.

Negative immittance converters are used in so-called two-wire repeaters forming part of a telephone system. Such a two-wire repeater, also called negistor, comprises one negative immittance converter used as a negative admittance converter and another negative immittance converter used as a negative impedance converter. The negative impedance converter is connected in series with the line and the negative admittance converter in shunt with the line. Such negistors are used in local cables, if the subscriber is connected to the distant exchange by means of a large line length. These local lines are generally unpupinized lines. Negistors are also used between, for example, a trunk circuit and a junction circuit which usually has pupinized lines, and also if these circuits are connected by long lines having a high attenuation.

A negistor primarily has to repeat and equalize in the voice-frequency band from 300–3400 Hz. Signals outside this band further have to be allowed to pass with no more than a slight attenuation. These signals, for example, are the DC power supply of the telephone set, and count pulses at for example 50 Hz and 10 or 16 KHz. To pass these, the negistor must have a reasonably reproducible signal transmission between 0 and 16 KHz.

A negistor of the type mentioned hereinbefore is described in, for example, Philips Telecommunication Review, Volume 23, no. 1, October 1961, pp. 1–20. On page 10 of this article an example of a negative impedance converter is shown, and on page 11 of this article is an example of a negative admittance converter. The design of these two converters is substantially identical. In the negative admittance converter the first coil of the first transformer is coupled to the line and the second coil of the second transformer is terminated by a terminating impedance. In the negative impedance converter the second coil of the second transformer is coupled to the line and the first coil of the first transformer is coupled to an additional winding accmmodated on the transformer, between whose terminals the terminating impedance is arranged.

In the negative admittance converter described above the 180° phase shifter is formed by an additional winding which is accommodated on the first coil. Each of the terminals of this additional winding is connected to a control input of one of the repeater elements. The use of this additional winding is disadvantageous in that the desired 180° phase shift is restricted to a relatively narrow frequency range as a result of the sub-ideal behavior of the first transformer. This sub-ideal behavior is caused by the finite self inductance of the transformer, parasitic capacitances, winding resistances and leakage inductances.

The above deviations as a result of the sub-ideal behavior are exhibited in the voice frequency band from 300–3400 Hz and over, by among other things non-linear distortion; and outside this band dips in the transmission characteristic, i.e., attenuation peaks, occur below and above this band in connection with the terminating impedances of the converters. In addition, these attenuation peaks are irreproducible owing to the tolerances in the elements, which are even enhanced by the principle of the conversion (feedforward). This implies that the frequencies at which these attenuation peaks occur are subjected to large tolerances, so that the count pulses at for example 50 Hz or 12 KHz are not always transmitted properly and, besides, lead to audible distortions during communication owing to their rather high level when compared to speech.

SUMMARY OF THE INVENTION

The object of the invention is to provide a solution to the above disadvantages and is characterized in that the 180° phase shifter is formed by a direct voltage differential amplifier, whose one input is connected to a terminal of a voltage divider that is inserted between the first terminal of the first and the second coil, the other input of the differential amplifier being connected to a terminal of a voltage divider that is inserted between the second terminals of the first and the second coil, and the control inputs of the first and the second amplifier element each being connected to an output of the differential amplifier.

The invention will be described with reference to the drawings.

BRIEF DESCRIPTION OF THE DRAWING

FIG. 4 is a fragmentary diagram of a variation of the FIG. 1 embodiment using Darlington-pair amplifier elements.

DESCRIPTION OF THE PREFERRD EMBODIMENT

Figure 1:
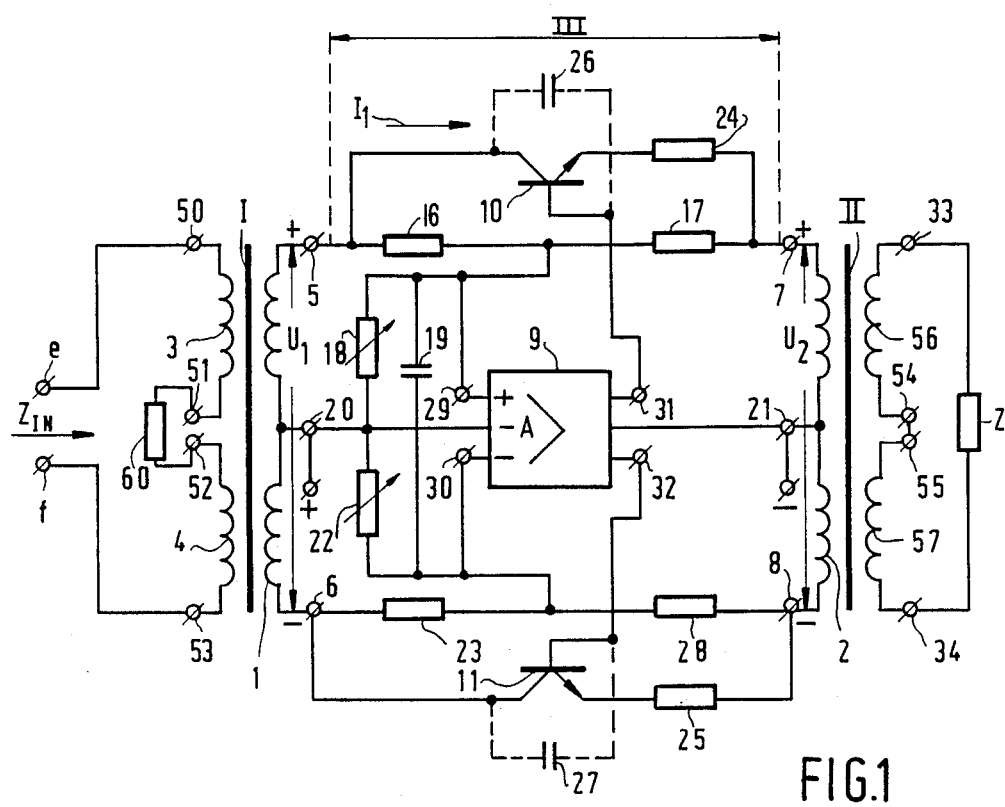
FIG. 1 is a schematic wiring diagram of an embodiment of a negative immittance converter according to the invention.
Figure 3:
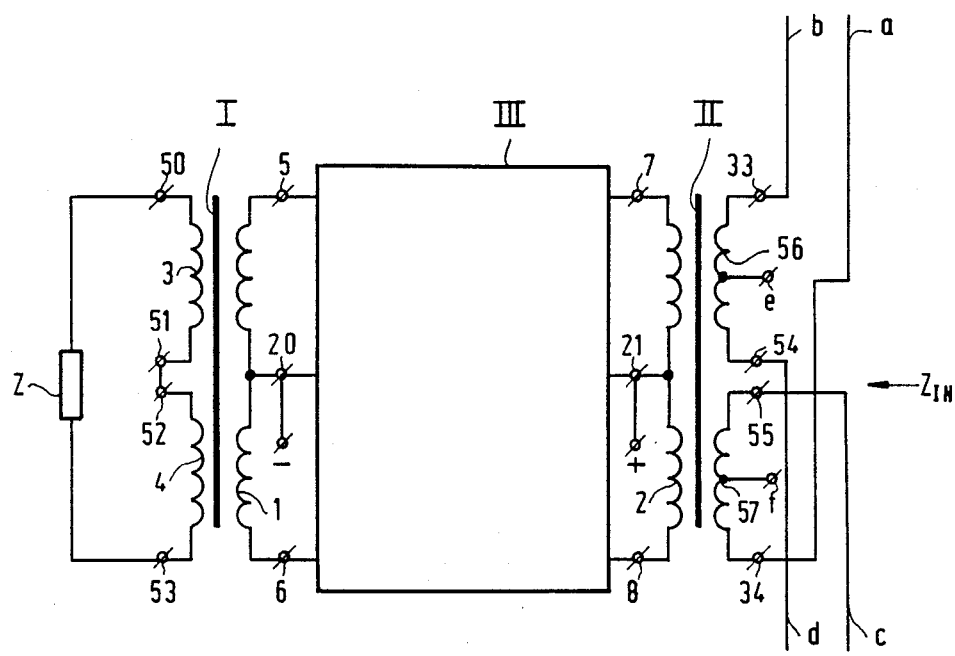
FIG. 3 shows an embodiment of a negative impedance converter according to the invention.

In the embodiment as shown in FIG. 1 a negative immittance converter operates as a negative admittance converter. In this Figure, I denotes the first transformer comprising a first coil 1 and two primary windings 3 and 4. The terminals 51 and 52 are connected through a capacitive impedance 60. The terminals 50 and 53 are connected to the respective center taps e and f of the coils 56 and 57 of the negative impedance converter as shown in FIG. 3. The primary windings are thus effectively connected in shunt with the line. The capacitive impedance 60 is used for blocking the direct current. The first terminal 5 of the first coil 1 is connected to the collector of the power transistor 10; this transistor operates as the first amplifier element. The first terminal 5 of the first coil 1 is also connected to the first terminal 7 of the second coil 2 of the second transformer II via the voltage divider formed by the resistors 16 and 17. The emitter of the transistor 10 is connected to the first terminal 7 of the second coil via the impedance 24. The second terminal 6 of the first coil 1 is connected to the collector of the power transistor 11; this transistor operates as the second amplifier element. The second terminal 6 of the first coil is also connected to the second terminal 8 of the second coil 2 via a voltage divider formed by the resistors 23 and 28. The emitter of the transistor 11 is connected to the second terminal 8 of the second coil 2 via the impedance 25.

The center tap 20 of the first coil 1 is connected to a point of positive constant potential, and the center tap 21 of the second coil is connected to a point of negative constant potential. The junction of the resistors 16 and 17 is connected to the input 29 of a DC differential amplifier 9. The junction of the resistors 23 and 28 is connected to the input 30 of the differential amplifier 9. Between the inputs 29 and 30 of the differential amplifier 9 a capacitor 19 is inserted. The input 29 of the differential amplifier 9 is connected to the center tap 20 of the first coil 1 via an adjustable resistor 18. Similarly, the input 30 of the differential amplifier 9 is connected to the center tap 20 of the first coil 1 via an adjustable resistor 22. The output 31 of the differential amplifier 9 is connected to the control input of the transistor 10. Similarly, the output 32 of the differential amplifier 9 is connected to the control input of the transistor 11. The second transformer II comprises the primary windings 56 and 57 which are connected in series, and also comprises the terminating impedance Z between the terminals 33 and 34.

Figure 2:
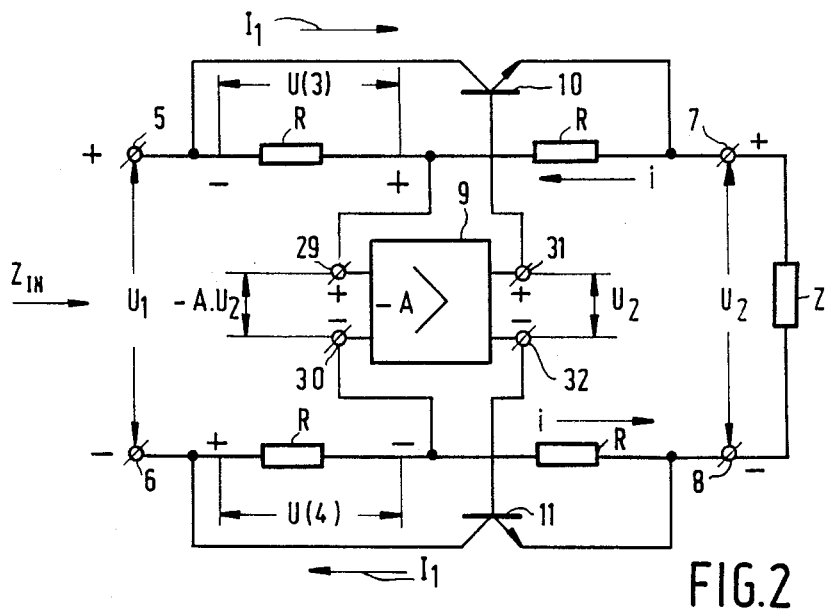
FIG. 2 shows the voltage and current polarities to explain the opration of the converter as shown in FIG. 1.

For simplicity, the effects of the resistors 18 and 22, the capacitor 19, the impedances 24 and 25 and the base-emitter voltages of the transistors 10 and 11 are initially disregarded in an explanation of the operation of the negative, admittance converter with reference to FIG. 2. The resistances of the resistors 16, 17, 23 and 28 are selected to be equal to R. It is assumed that between the terminals 5 and 6 of the first coil 1 of the transformer I there is a voltage equal to $U_1$ and between the terminals 7 and 8 of the second coil of the second transformer II a voltage equal to $U_2$. The voltage between the outputs 31 and 32 of the differential amplifier 9 will be equal to $U_2$ when disregarding the effects stated above. If the gain of the differential amplifier 9 is equal to $-A$, the voltage between the inputs 29 and 30 of the differential amplifier 9 will be equal to $-U_2/A$. this voltage is substantially equal to 0 at a sufficiently large A. This implies that a current i equal to $U_2/2R$ will pass through the resistors 17 and 28. Since the input current of the differential amplifier 9 is negligibly small, this current i will also pass through the resistors 16 and 23. The voltage drop U(3) across resistor 16 will thus be equal to ½ $U_2$ and the voltage drop U(4) across resistor 23 will also be equal to ½ $U_2$. Since the voltage between the junctions 29 and 30 is substantially equal to 0, $U_1$ will be equal to $-U_2$. If it is further assumed that the winding ratio n of the two transformers I and II is equal to 1, and that the current $i \ll I_1$, where $I_1$ is the current through the first amplifier element or transistor 10, the following relationships will hold:

$$Z_{in} = U_1/I_1 \qquad (1)$$

$$I_1 = U_1/Z \qquad (2)$$

A combination of the relationships (1) and (2) provides with $U_1 = -U_2$ $$(U_1/Z_{in} = U_2)/Z = -Z \qquad (3)$$

The use of the differential amplifier 9 in conjunction with the resistors 16, 17, 23 and 28 for realizing the 180° phaseshift between the voltages $U_2$ and $U_1$ is advantageous in that no additional winding is required on the second transformer II. Consequently, the two transformers I and II can be arranged completely identical. In addition to the advantage of better impedance conversion and better admittance conversion this circuit also has advantages from a manufacturing point of view, because only one type of transformer is required. As a result of the feedback with the aid of the resistors 16, 17 and 23, 28 the converter operates virtually free of distortion up to the limits at which it is driven to full voltage swing, even for the agressive count pulses at for example 25 or 50 Hz. Because the frequency characteristic is less affected by the sub-ideal behavior of the transformers, this characteristic is strongly improved. Outside the 300–3400 Hz speech frequency band there is a uniform decrease of the gain without the marked attenuation peaks occurring with known converters.

The resistors 18 and 22 are inserted to give the proper D.C. set values to the converter in view of the best possible drive to full voltage swing. The resistance of the resistors 18 and 22 is chosen to be substantially equal to the resistance of the resistors 16 and 17. With the insertion of the resistors 18 and 22 the effective gain of the differential amplifier 9 becomes approximately equal to $-A/3$. The two resistors 18 and 22 can to be slightly varied with the aid of a potentiometer to correct the direct voltage offset at the outputs 31 and 32. This offset mainly arises as a result of the tolerances in the winding resistance of the transformers, because the largest currents pass through the power transistors 10 and 11.

In order to reduce the mutual influence of the differential amplifier and the power transistor 10 and 11, as shown in FIG. 4 these transistors are preferably arranged as Darlington amplifiers 10A and 11A. The balance of the circuit remains unchanged.

The capacitor 19 between the inputs 29 and 30 of the differential amplifier 9 is inserted to cancel the negative admittance conversion for frequencies $>10$ KHz. The converter behaves as a positive admittance converter at these frequencies and neutralizes the behavior of the transformers at these frequencies. In addition, at relatively high frequencies, 50–100 KHz, weak instabilities can be suppressed by inserting small capacitors 26 and 27 between the collector and the base of the transistors 10 and 11, or the collectors and the input base of the Darlington pairs 10A and 11A.

In the embodiment as shown in FIG. 3 a negative immittance converter is connected as a negative impedance converter. The structure of the section III, except for being a mirror image arrangement is the same as that of the negative admittance converter as shown in FIG. 1 between the dashed lines. The terminating impedance Z is inserted between the terminal 50 of winding 3 and the terminal 53 of the winding 4. The terminal 51 of coil 3 and the terminal 52 of coil 4 are interconnected. The terminal 5 and the terminal 6 of the first coil of the first transformer are connected to the section III in the way shown in FIG. 1. The line b is connected to the terminal 33 of the winding 56 having a center tap on the transformer II. The line a is connected to the terminal 34 of the winding 57 having a center tap f on the transformer II. The center taps e and f are connected to the points 3 and f of the negative admittance converter as shown in FIG. 1. The line d is connected to the terminal 54 of the winding 56. The line c is connected to the terminal 55 of the winding 57. In this way the negative impedance converter is effectively arranged in series with the respective lines b and a, c and d .

The operation of the section III of the converter of FIG. 3 is exactly the same as the operation of the section III of FIG. 1, so that here too relationship 3 applies. The transformers I and II of the negative impedance converter as shown in FIG. 3 are of the same type as the transformers I and II of the negative admittance converter as shown in FIG. 1. If a negistor is constructed with the aid of these converters, a single type of transformer can be used which is tremendously advantageous from a manufacturing point of view.

What is claimed is:

1. A negative immittance converter, comprising
   a first transformer including a first coil having first and second terminals and a center tap,
   a second transformer including a second coil having respective first and second terminals and a center tap,
   first and second amplifier elements each having a respective control input, the first amplifier element being connected between the first terminal of the first coil and the first terminal of the second coil, and the second amplifier element being connected between the second terminal of the first coil and the second terminal of the second coil,
   respective power supply points connected to the respective center taps of the first and second coils, and
   a 180° phase shifter connected between the first and second terminals of the second coil and the respective control inputs of said amplifier elements,
   characterized in that said 180° phase shifter is formed by a voltage differential amplifier having two inputs, and
   said converter comprises a first voltage divider connected between the respective first terminals of the first and second coils, having a terminal connected to one input of said voltage differential amplifier, and a second voltage divider connected between the respective second terminals of the first and second coils and having a respective voltage divider terminal connected to the other input of said voltage differential amplifier,
   said control inputs of the first and second amplifier elements being respectively connected to respective outputs of the differential amplifier.

2. A converter as claimed in claim 1, characterized by comprising two adjustable resistors and a point of constant potential, one of said adjustable resistors being connected between said one input of the differential amplifier and said point of constant potential, and the other adjustable resistor being connected between the other input of the differential amplifier and said point of constant potential.

3. A converter as claimed in claim 2, characterized by comprising a capacitor inserted between the inputs of the differential amplifier.

4. A converter as claimed in claim 3, characterized in that said first and second amplifier elements are each formed by a respective Darlington amplifier.

5. A converter as claimed in claim 4, characterized by comprising first and second capacitors respectively inserted between the respective collectors of the Darlington amplifiers and the respective basis of the respective input transistors of the Darlington amplifiers.

6. A converter as claimed in claim 2, characterized in that said first and second amplifier elements are each formed by a respective Darlington amplifier.

7. A converter as claimed in claim 6, characterized by comprising first and second capacitors respectively inserted between the respective collectors of the Darlington amplifiers and the respective basis of the respective input transistors of the Darlington amplifiers.

8. A converter as claimed in claim 1, characterized in that said first and second amplifier elements are each formed by a respective Darlington amplifier.

9. A converter as claimed in claim 8, characterized by comprising first and second capacitors respectively inserted between the respective collectors of the Darlington amplifiers and the respective basis of the respective input transistors of the Darlington amplifiers.

10. A converter as claimed in claim 1, characterized by comprising a capacitor inserted between the inputs of the differential amplifier.

11. A converter as claimed in claim 10, characterized in that said first and second amplifier elements are each formed by a respective Darlington amplifier.

12. A converter as claimed in claim 11, characterized by comprising first and second capacitors respectively inserted between the respective collectors of the Darlington amplifiers and the respective basis of the respective input transistors of the Darlington ampilfiers.

* * * * *